(12) United States Patent
Mathew et al.

(10) Patent No.: US 6,356,334 B1
(45) Date of Patent: *Mar. 12, 2002

(54) LIQUID CRYSTAL DISPLAY ASSEMBLY AND METHOD FOR REDUCING RESIDUAL STRESSES

(75) Inventors: Ranjan J. Mathew, San Jose; Seshadri Vikram, Fremont, both of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/130,631

(22) Filed: Aug. 6, 1998

(51) Int. Cl.[7] .................... G02F 1/1333; G02F 1/1345; G02F 1/1339
(52) U.S. Cl. ................... 349/153; 349/58; 349/149
(58) Field of Search ................... 349/58, 153, 152

(56) References Cited

U.S. PATENT DOCUMENTS 5,818,564 A * 10/1998 Gray et al. ............... 349/161
5,880,795 A * 3/1999 Nagata et al. ............ 349/58
5,969,783 A * 10/1999 Takiar et al. ............. 349/150

\* cited by examiner

Primary Examiner—William L. Sikes
Assistant Examiner—Dung Nguyen
(74) Attorney, Agent, or Firm—Beyer Weaver & Thomas

(57) ABSTRACT

Apparatus are disclosed for Liquid Crystal Display (LCD) assemblies having a display device that is attached to a support substrate. The display device includes a die having a pixel array, and a transparent plate positioned over the die. An adhesive seal couples the die to the transparent plate. The seal together with the transparent plate and the die cooperate to define a sealed volume therebetween encompassing the pixel array. A liquid crystal material is disposed within the sealed volume. A support substrate is coupled to the transparent plate for support of the display device such that the die is substantially insulated from transmission of residual stresses induced by or acting upon the support substrate. Methods of reducing residual stresses in LCD assemblies are also provided.

18 Claims, 7 Drawing Sheets

LIQUID CRYSTAL DISPLAY ASSEMBLY AND METHOD FOR REDUCING RESIDUAL STRESSES

TECHNICAL FIELD

The present invention relates, generally, to liquid crystal display assemblies and, more particularly, relates to miniature liquid crystal display assemblies constructed to reduce residual stresses.

BACKGROUND ART

In the recent past, substantial research and development resources have been directed toward small scale Liquid Crystal Display (LCD) and light valve technologies. These miniature LCD assemblies are typically employed in high resolution projection displays, such as a reflective LCD projectors, SXGA formats (1,280×1,024 pixel resolution) and even HDTV formats (above 1,000 line resolution), or the like.

Briefly, as shown in FIGS. 1 and 2, a conventional small scale LCD assembly 20 is illustrated including a die 21 having a pixel array 22. This pixel array 22 is typically composed of rows and columns of electrically conductive pathways each forming an individual pixel (not shown). Each pixel can be individually changed to an "on" condition by selecting the appropriate row and column of pixel array 22. Positioned around or concentrated on one end of the pixel array are a plurality of die bond pads 23 which are internally connected to the pixel array 22 to enable operational control thereof. Selection of the appropriate pixel is controlled by control circuitry, either included within the die 21 or external to the die 21. In either configuration, external control signals may be used to control the functions of the die 21.

As best viewed in FIGS. 2 and 3, a transparent glass plate 24 is typically placed over the die 21 and the pixel array 22, such that a portion of the glass plate 24 overhangs the die 21. The glass plate 24 is, usually affixed to die 21 through an adhesive seal 25 which together cooperate to define a sealed volume encompassing the pixel array 22. This sealed volume is then commonly filled with a solution 26 of Polymer Dispersed Liquid Crystals (PDLC). To facilitate grounding of the glass plate 24, a conductive coating (not shown) may be deposited over the undersurface 28 thereof.

The die 21 is typically rigidly or semi-rigidly mounted to a substrate 27 for mounting support and heat conductive dissipation for the die. A conductive adhesive 29 (FIG. 3), such as a conductive epoxy, is generally applied to the undersurface 28 of the die 21 to affix the die directly to the top surface of the substrate 27. Accordingly, a heat conductive pathway is created directly between the die and the substrate to dissipate heat generated by the die.

The substrate 27 generally includes a plurality of substrate bond pads 30 which are typically wire bonded to the die bond pads 23 through bonding wires 31. Finally, a glob coating 32 is applied to seal die 21 to substrate 27. The glob coating 32 (FIG. 3) further normally encapsulates the bonding wires 31 and the internal elements of die 21 without obscuring a view of the pixel array 22 through the glass plate 24.

By activating the appropriate pixels, the corresponding liquid crystals in the PDLC, deposited in sealed volume, are caused to either align or disperse. Upon alignment, light is permitted to pass through the aligned crystals and the adjacent glass plate, thus appearing light in color. In contrast, when the liquid crystals are dispersed, light is prevented from passing therethrough and, hence the glass plate 24, so that the corresponding pixel appears dark in color.

One important aspect in the proper operation of these small scale LCD or light valve assemblies is the maintenance of proper distance uniformity (preferably about 2–4 $\mu$m) between the pixel array and the undersurface 33 of the glass plate. Variances in the separation of the glass plates may often times cause the pixel array to function improperly or cause operational failure.

Conventional rigid display device constructions, for example, often warp during operation since the substrate 27, the glass plate 24 and the silicon die 21 are all composed of materials or composites having different coefficients of expansion. The individual components of the LCD assembly, therefore, often expand at different degrees and rates. Further, depending in part upon the construction processes, such as the adhesive curing techniques, significant residual stresses may be induced upon the cell. Eventually, in severe instances, the glass plate 24 may delaminate from the die 21. At a minimum, these internal stresses cause optical defects such as variations in color uniformity and fringes, and variations in the cell gap thickness may cause optical shadows.

This is especially true since the undersurface 28 of the die 21 is typically rigidly affixed or attached directly to the substrate. For example, when the substrate and the dies are both composed of a silicon material, upon heating, the glass plate expansion tends to negatively bow or warp (FIG. 4) at a rate greater than that of the die and substrate. Therefore, upon more extensive high temperature thermal cycling during operation, the glass plate 24 may eventually delaminate from the die 21 to expose the Polymer Dispersed Liquid Crystals (PDLC) 26.

In contrast, when the die 21 is composed of a silicon material and the substrate 27 is composed of a more conductive material, such as aluminum, upon heating, the substrate expansion tends to positively bow or warp (FIG. 5) the substrate at a rate greater than that of the die 21 and glass plate 24. As viewed in the cross-sectional view of FIG. 5, central thinning of the PDLC 26 is caused which result in discoloration and the appearance of optical shadows and nonuniformity.

Moreover, during low temperature conditioning, the glass plate 24 often fractures due to internal stress induced by the substrate, which is then transmitted to the glass through the rigidly mounted die. This is especially problemsome at the regions where the adhesive mounts the die to the substrate, and/or where the glob coating contacts the glass.

Accordingly, there is a need to provide a LCD assembly which minimizes residual stress induced upon the cell.

DISCLOSURE OF INVENTION

The present invention provides a liquid crystal display assembly comprising a display device and a support substrate. The display device includes a die having a pixel array, and a transparent plate positioned over the die. An adhesive seal adhesively couples the die to the transparent plate, which together with the transparent plate and the die cooperate to define a sealed volume therebetween encompassing the pixel array. A liquid crystal material is disposed within the sealed volume. The support substrate is coupled to the transparent plate for support of the display device such that the die is substantially insulated from transmission of residual stresses induced by or acting upon the substrate.

In one aspect of the present invention, the substrate may be mounted to the transparent plate at a single point location, while in another aspect, the substrate may be mounted to the transparent plate proximate a single peripheral edge portion thereof. An adhesive may be positioned between the substrate and the transparent plate for either single point mounting or the single peripheral edge portion mounting.

In another aspect of the present invention, the substrate provides a cavity formed and dimensioned for receipt of the die therein which is of a depth sufficient for non-contact between the die undersurface and the substrate.

In still another aspect of the present invention, a liquid crystal display assembly includes a die having a pixel array, a top surface and an opposite undersurface. A transparent plate is provided coupled to the die through an adhesive seal. The adhesive seal, the transparent plate and the die cooperate to define a sealed volume therebetween encompassing the pixel array, which contains a liquid crystal material disposed therein. A support substrate is coupled to the transparent plate for support of both the transparent plate and the mounted die thereon in a manner substantially non-attached to the die.

The substrate defines a cavity in a top surface thereof formed and dimensioned for receipt of the die therein, and is of a depth sufficient for substantial non-contact between the die undersurface and the substrate such that a gap is formed between a floor of the cavity and the undersurface of the die. A thermoconductive material may be positioned in the cavity between and contacting the die undersurface and the cavity floor for heat conduction therebetween.

In yet another aspect of the present invention, a liquid crystal display assembly is provided including a die having a pixel array, a top surface and an opposite undersurface, and a transparent plate. An adhesive seal adhesively couples the die to the transparent plate such that a ledge portion thereof extends beyond a peripheral edge portion of the die. Similarly, the adhesive seal, the transparent plate and the top surface of the die cooperate to define a sealed volume encompassing the pixel array in which a liquid crystal material is deposited therein. A relatively rigid support substrate includes a shoulder portion adapted to cooperate with the ledge portion of the transparent plate for support of the transparent plate and the die with the substrate while the underside surface of the die remains relatively free of substantial supportive mounting to the substrate. A conductive adhesive mounting the plate ledge portion to the substrate shoulder portion.

In another aspect of the present invention, a method of packaging a liquid crystal display assembly is included comprising the steps of: providing a display device including a die having a pixel array, a transparent plate, an adhesive seal adhesively coupling the die to the transparent plate, and a liquid crystal material disposed within a sealed volume formed between the adhesive seal, the transparent plate and the die; and mounting the transparent plate to a support substrate for support of the display device such that the die is substantially insulated from transmission of residual stresses induced by or acting upon the substrate.

The mounting step may include the step of applying an adhesive to not more than a single point location or not more than a single strip location between the transparent plate and the substrate for mounting thereto. In another embodiment, the present inventive method includes the step of providing a cavity in a top surface of the substrate formed and dimensioned for receipt of the die therein when the display device is mounted to the substrate.

In another method of the present invention, a method of packaging a liquid crystal display assembly is included comprising the steps of: adhesively coupling a transparent plate to a die having a pixel array such that a ledge portion of the plate extends beyond a peripheral edge portion of the die; and depositing a liquid crystal material within a sealed volume formed between the adhesive seal, the transparent plate and the die. The inventive method further includes the step of affixing the ledge portion of the transparent plate to an upstanding shoulder portion of a support substrate for support of the transparent plate and the die with the substrate while an underside surface of the die remains relatively free of substantial supportive mounting to the substrate.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

BEST MODE OF CARRYING OUT THE INVENTION

Figure 1:
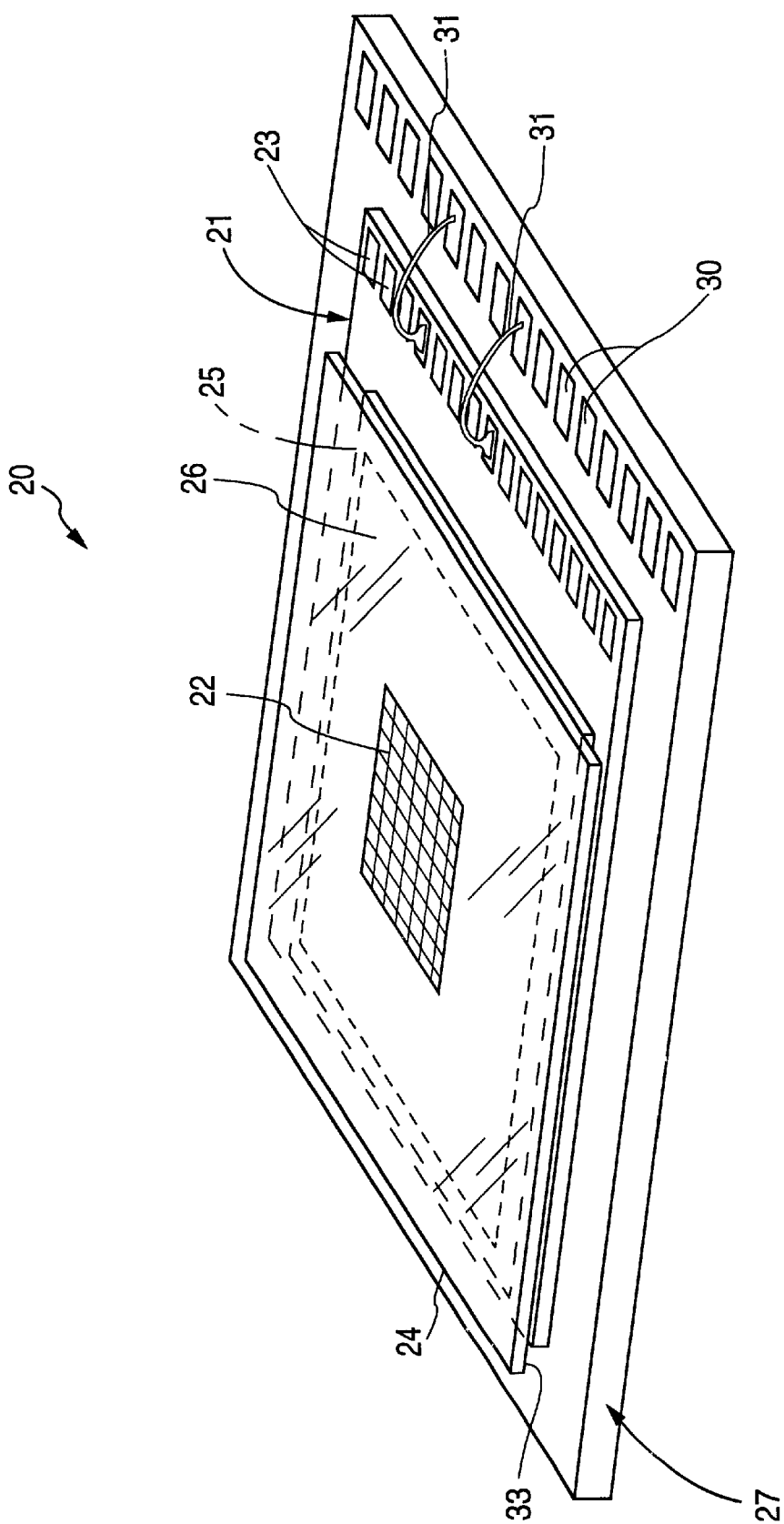
FIG. 1 is a top perspective view of a prior art Liquid Crystal Display (LCD) assembly illustrating a die rigidly mounted to a substrate.
Figure 2:
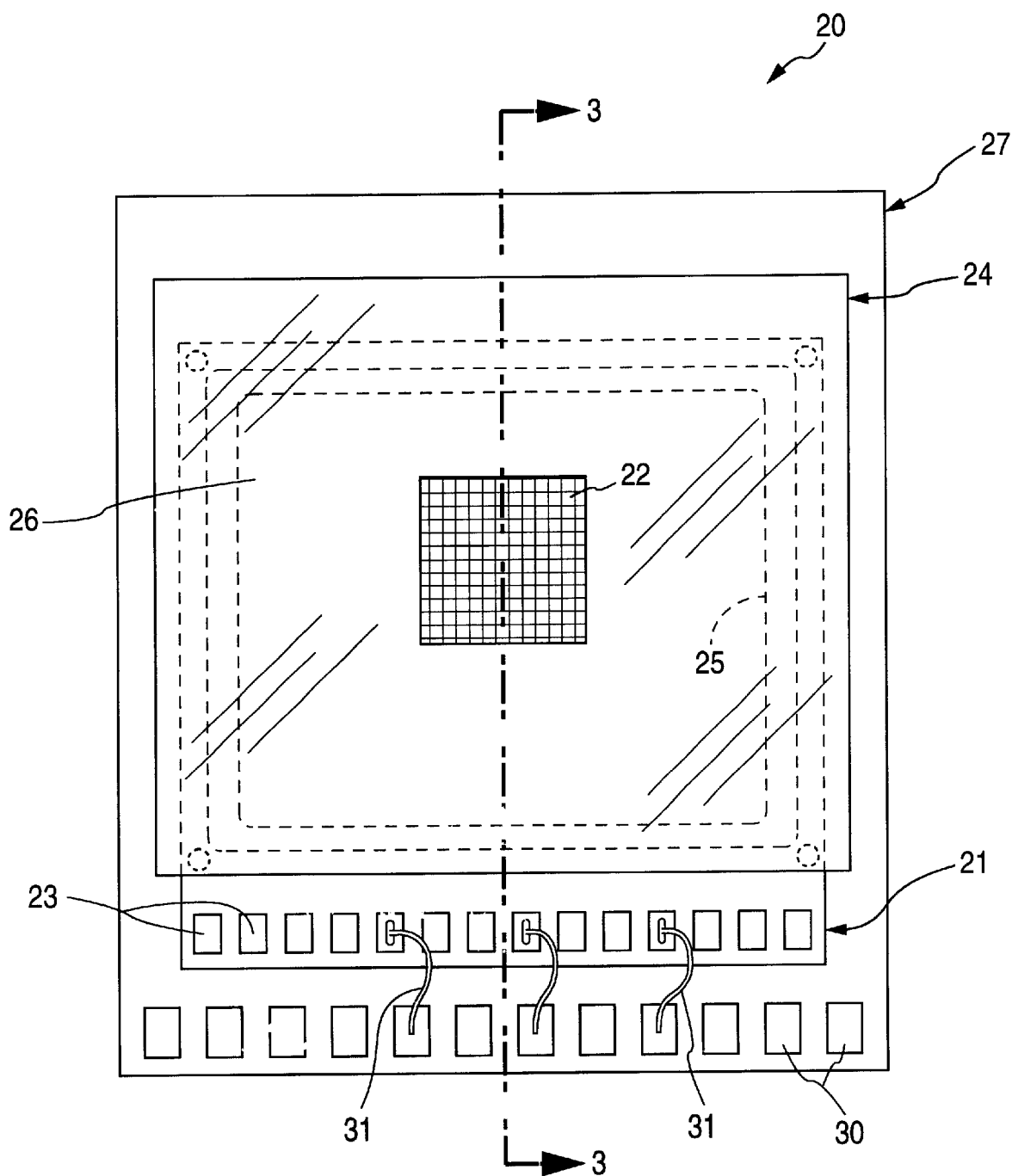
FIG. 2 is a top plan view of the prior art LCD assembly of FIG. 1
Figure 3:
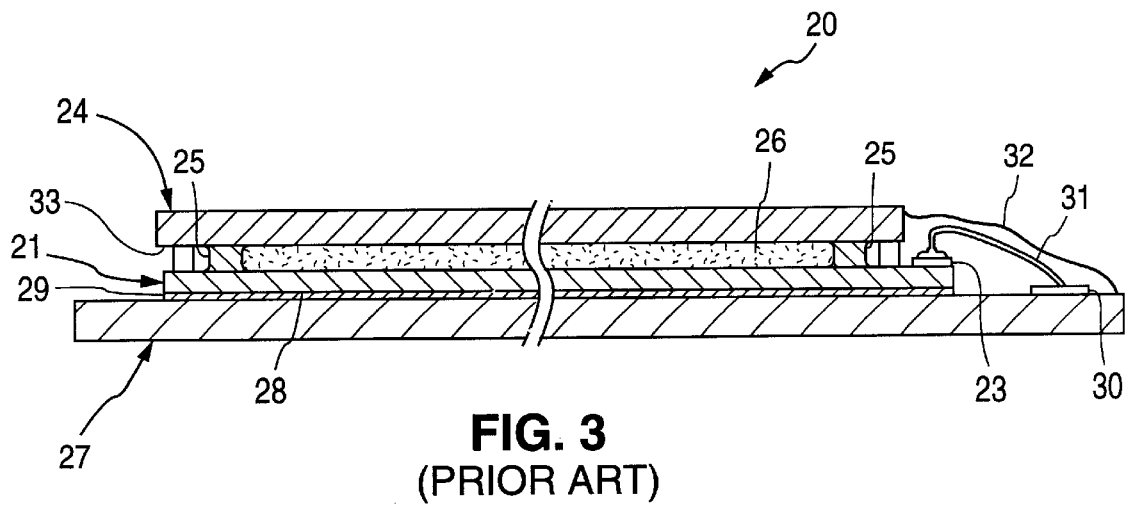
FIG. 3 is an enlarged, fragmentary, side elevation view, in cross-section, of the prior art LCD assembly taken substantially along the plane of the line 3—3 in FIG. 2.
Figure 4:
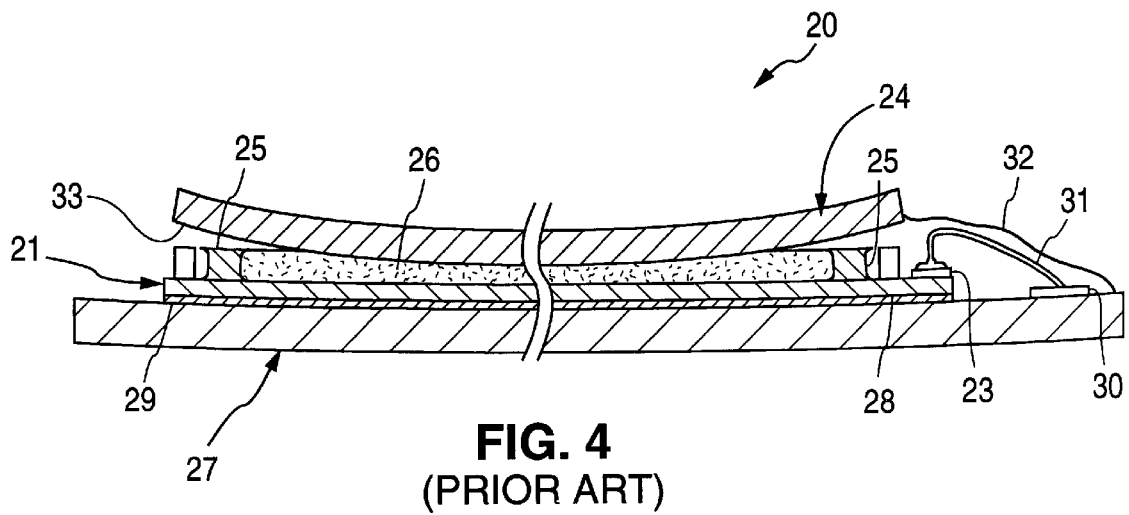
FIG. 4 is a fragmentary, side elevation view, in cross-section, of the prior art LCD assembly of FIG. 3, and illustrating delamination of the transparent plate from the die resulting from a negative bow configuration.
Figure 5:
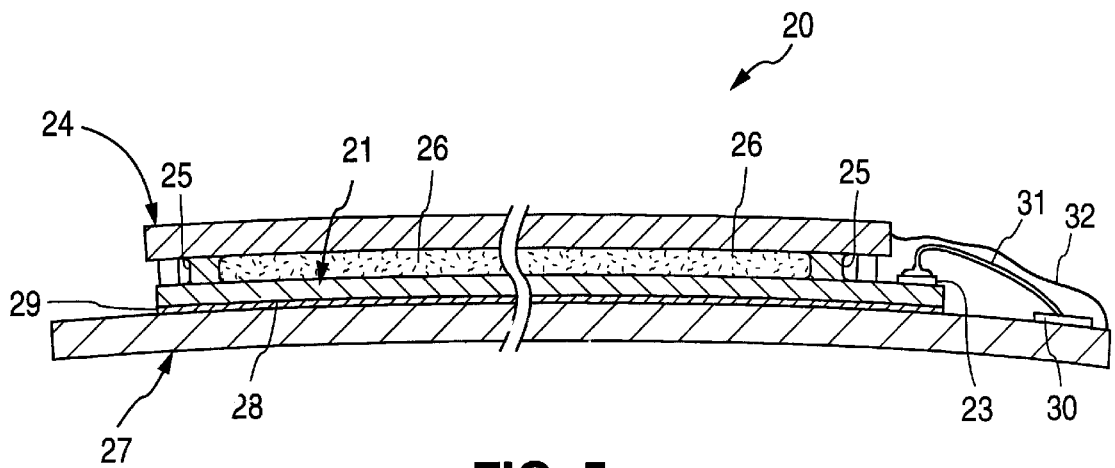
FIG. 5 is a fragmentary, side elevation view, in cross-section, of the prior art LCD assembly of FIG. 3, and illustrating a positive bow configuration.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIGS. 6–9 where a Liquid Crystal Display (LCD) assembly, generally designated 40, is illustrated having a display device 41 which is attached to a support substrate 42. The display device 41 includes a die, generally designated 43, having a pixel array 45, and a transparent plate 46 positioned over the die 43. An adhesive seal 47 (FIGS. 6 and 8) adhesively couples the die 43 to the transparent plate 46. The adhesive seal 47 together with the transparent plate 46 and the die 43 cooperate to define a sealed volume therebetween encompassing the pixel array 45. A liquid crystal material 51 is disposed within the sealed volume. The support substrate 42 is coupled to the transparent plate 46 for support of the display device 41 such that the die 43 is substantially insulated from transmission of residual stresses induced by or acting upon the substrate 42.

Accordingly, the present invention provides a liquid crystal display device which substantially insulates the die from the stress induced warpage of the substrate, the cumulative effect of which minimizes the residual stress on the liquid crystal cells. Stress induced transparent plate delamination is substantially reduced to increase operational longevity. Moreover, since the resulting warpage or bow of display device 41 is substantially reduced during operation, the internal stress induced optical defects, including variations in color uniformity and fringes, and optical shadows are substantially minimized.

Referring back to FIG. 6, a diagrammatic perspective view of a small scale LCD assembly is provided having a transparent plate 46 partially cut away for illustrative purposes. The composition of transparent plate 46 may be of any suitable material such as glass and plastic, or the like, providing substantial rigidity. A conductive coating (not shown) may be applied to the undersurface 52 of the plate, such as indium-tin oxide. While the transparent plate 46 is preferably rectangular, it will be understood that the peripheral shape thereof may any geometric shape sufficient to cover the pixel array 45 of the die, while further sufficiently mounting to the display device 41 to the substrate.

Briefly, the small scale LCD assembly 40 includes a pixel array 45 formed on die 43. Die bond pads 53 are preferably disposed on one side of the silicon die 43 which are electrically coupled to pixel array 45 through internal circuitry (not shown) to facilitate control of the pixel array 45. Bond pads 53 also provide electrical connection from the ground and power of the die 43 to the ground and power of a substrate.

Figure 7:
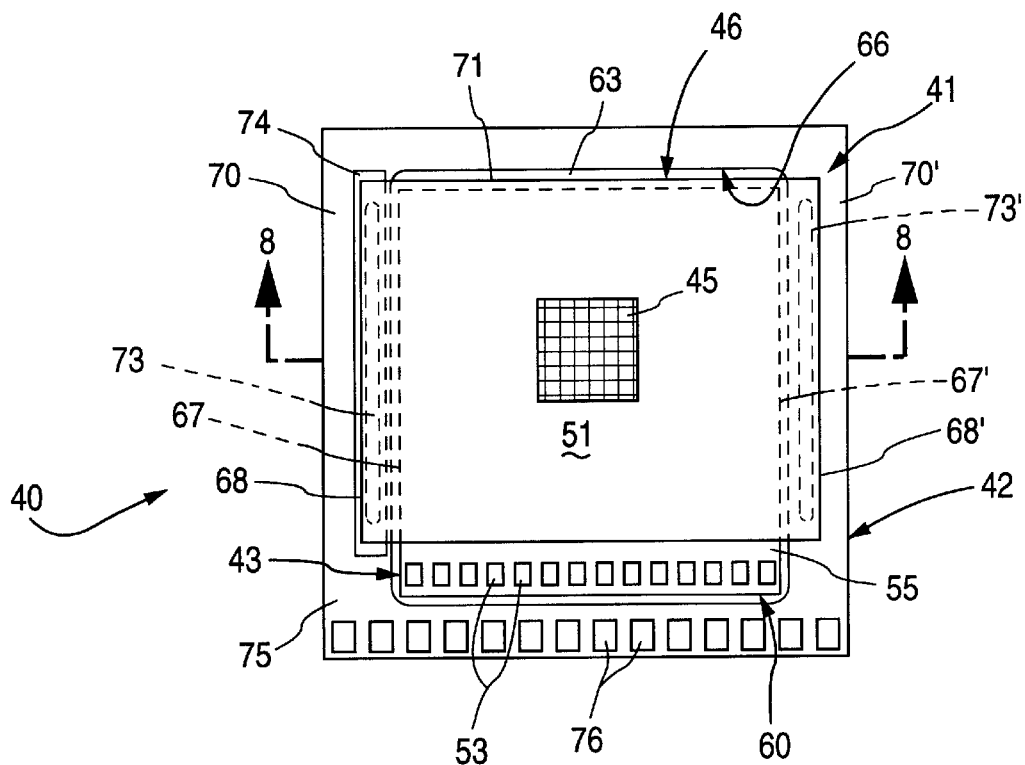
FIG. 7 is a top plan view of LCD assembly of FIG. 6 showing an adhesive mounting of the transparent plate to the substrate on opposed sides thereof.
Figure 8:
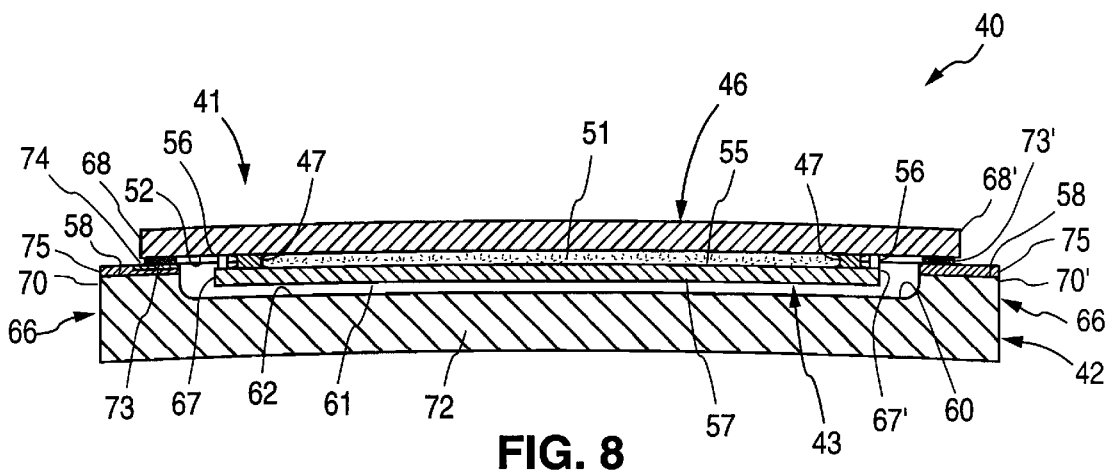
FIG. 8 is an enlarged, fragmentary, side elevation view, in cross-section, of the present invention LCD assembly taken substantially along the plane of the line 8—8 in FIG. 7.

An adhesive seal 47 is formed around the pixel array 45 on the top surface 55 of the die 43, and may be applied anywhere within the surface area of die 43 as long as the pixel array 45 is not obscured and the transparent plate 46 can be satisfactorily adhered to the LCD die 43. This adhesive seal 47 (as shown in FIGS. 7 and 8) further seals a volume between the transparent plate 46, die 43, and within the perimeter of the adhesive seal 47. Pixel array 45 is enclosed within this sealed volume.

This adhesive seal 47, accordingly, provides a relatively rigid or semi-rigid mounting of the die 43 to the transparent plate 46. A semi-rigid mounting, therefore, is defined as a mount which provides some elasticity, but for the most part provides a relatively rigid mounting. Suitable materials known in the art which function as an adhesive and a sealant, and provide semi-rigid mountings include epoxies, acrylics, plastics, polymers and mixtures thereof, or the like. Moreover, a fuisible seal may be applied around the pixel array, such as that described in co-pending U.S. patent application Ser. No. 09/056,165, entitled "Fusible Seal for LCD Devices and Methods for Making Same" by Ranjan J. Mathew and Hem P. Takiar, filed Apr. 6, 1998, and incorporated herein by reference in its entirety.

Figure 9:
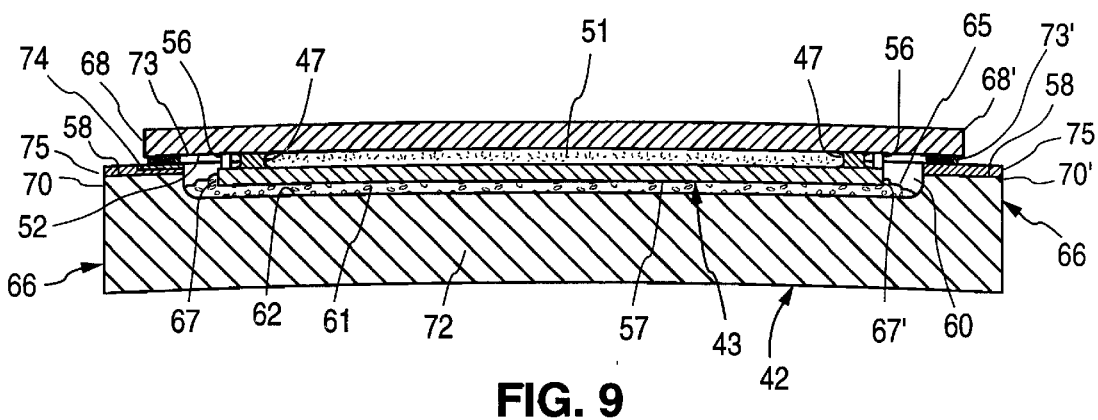
FIG. 9 is a fragmentary, side elevation view, in cross-section, of an alternative embodiment of LCD assembly of FIG. 8 having a thicker cavity base.
Figure 10:
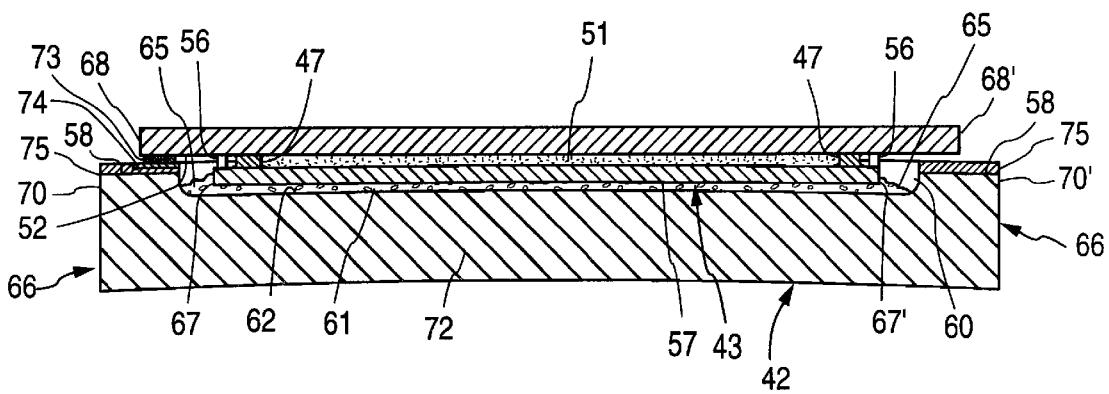
FIG. 10 is a fragmentary, side elevation view, in cross-section, of an alternative embodiment of LCD assembly of FIG. 8 having a single side, cantilever mount of the transparent plate to the substrate.

As shown in FIGS. 8–10, precision conductive spacers 56 may also be employed to facilitate a uniform spacing between the pixel array 45 and the transparent plate 46. The precision conductive spacers 56 are formed to a predetermined height required for the operation of the LCD assembly 40, and may be placed either within the area enclosed by adhesive seal 47 or outside the enclosed area. These precision conductive spacers are discussed in detail in co-pending U.S. patent application Ser. No. 08/925,846, entitled "Precision Conductive Spacers for Liquid Crystal Display Devices and Methods for Making Same" by Ranjan J. Mathew, filed on Sep. 8, 1997, and incorporated herein by reference in its entirety.

Once the adhesive seal 47 has properly cured, to complete the small scale display device 41, the sealed volume between transparent plate 46, die 43 and adhesive seal 47 can be filled with liquid crystals 51. Preferably, these liquid crystals 51 are Polymer Dispersed Liquid Crystals which are dispersed in a polymer solution. Other types of liquid crystals 51, however, may be utilized in accordance with the present invention.

Figure 6:
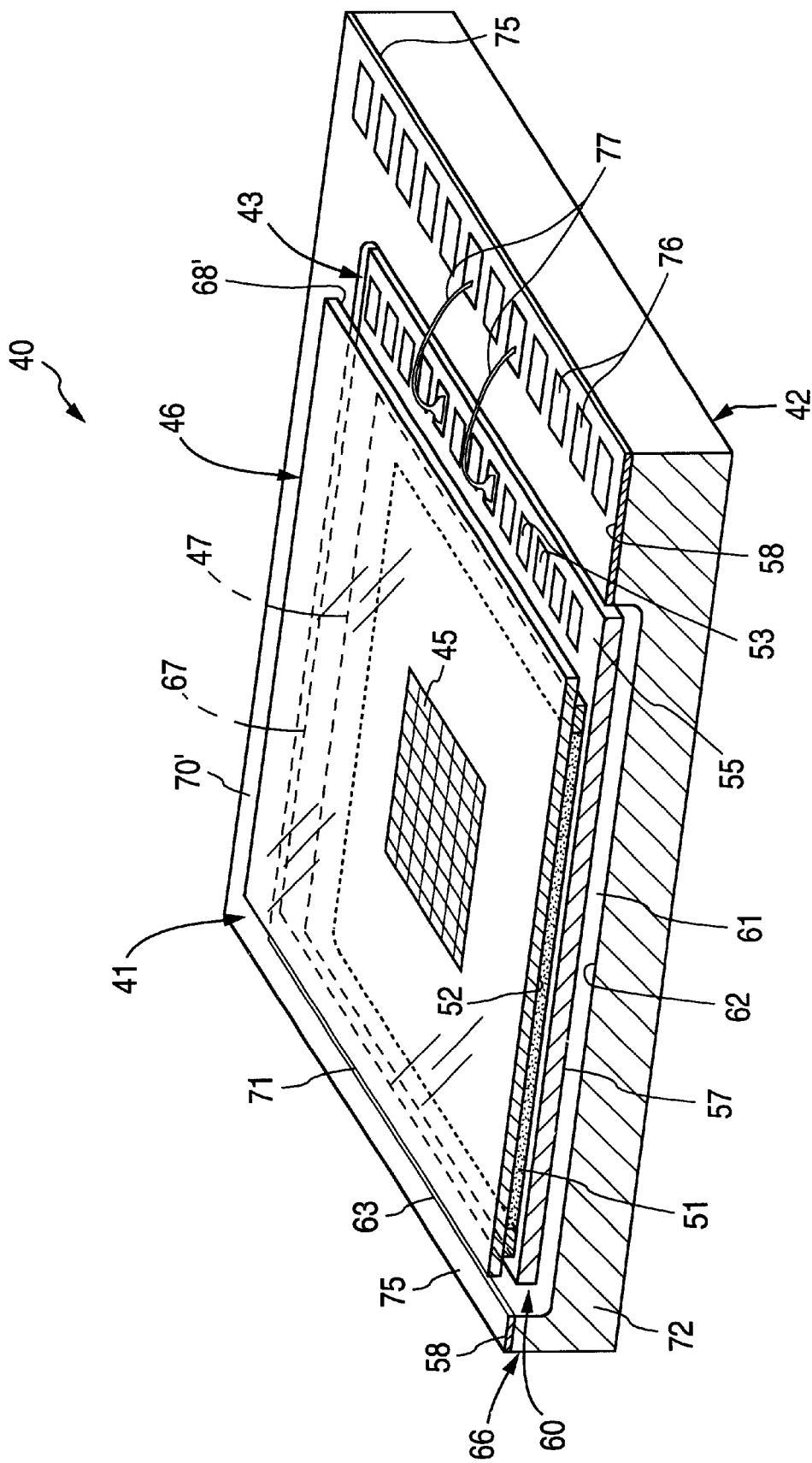
FIG. 6 is a top perspective view, partially broken-away, of a Liquid Crystal Display (LCD) assembly constructed in accordance with the present invention, and illustrating a cavity formed for receipt of the die therein.

In accordance with the present invention, the LCD assembly 40 includes a substrate 42 which is configured to cooperate with the display device 41 such that the die 43 is substantially insulated from transmission of residual stresses induced by or acting upon the substrate 42. This is preferably performed, as shown in FIGS. 6 and 8, by configuring the support substrate 42 in a manner so that the substrate is not rigidly or semi-rigidly attached directly to the die 43. Accordingly, residual stresses induced by or acting upon the substrate will not be transmitted directly to the die. Stress induced optical distortions, and transparent plate delamination, are therefore significantly reduced.

In one aspect, the undersurface 57 of the die 43 may be slideably supported directly atop the top surface 58 of the substrate 42 (not shown) without being directly attached to the substrate. Preferably, however, a cavity 60 is formed in the substrate top surface 58 which is dimensioned for receipt of the die 43 therein upon rigid or semi-rigid mounting of the transparent plate 46 to the die. As best viewed in FIG. 6, when die 43 is properly mounted to the transparent plate 46, and the plate is supportively mounted to and against the substrate 42, the die 43 is seated in the cavity 60 in a fashion non-contacting the interior walls defining the cavity 60 of the substrate 42. Cavity 60 is slightly peripherally larger than the periphery of the die 43 (FIG. 7), both of which are preferably rectangular in shape. Further, the cavity 60 is of a depth sufficient for substantial non-contact between the die undersurface and the substrate such that a gap 61 is formed between a floor 62 of the cavity 60 and the undersurface 57 of the die 43. Accordingly, since the die 43 is non-attached to the substrate, rigidly or semi-rigidly, and is preferably also in non-contact therewith, the die is essentially insulated from the residual stresses of the substrate by being suspended from the transparent plate 46.

The gap 61 formed between the die undersurface 57 and the cavity floor 62 is preferably about 0.5 mm to about 1.0 mm. Cavity 60 may be open to the surrounding air to effect radiation and convection cooling of the die during operation. Thus, air may flow into cavity 60 through port 63 (FIGS. 6 and 7), circulate therein, and then exit through port 63 for cooling of the die. More preferably, however, a thermoconductive material 65 (FIGS. 9 and 10) may be positioned in the cavity 60 between and contacting the die undersurface 57 and the cavity floor 62 for heat conduction therebetween. Such thermoconductive material 65 would provide a conductive pathway from the die undersurface 57 through the thermoconductive material 65 and into the substrate 42 for heat dissipation thereof.

It will be appreciated, of course, that the interdisposed thermoconductive material 65 does not rigidly or semi-rigidly mount or affix the die 43 to the support substrate 42. Therefore, the stress induced forces are not transmitted therebetween. Preferably, the thermoconductive material is provided by a conventional thermoconductive grease or the like.

Any suitable type of substrate may be utilized in accordance with the present invention. Support substrate 42, for example, may be provided by simple substrates and chip carriers, leaded chip carriers, grid array type substrates, as well as other types of substrates which can be used for supporting the display device 41. In the preferred form, support substrate 42 will be composed of aluminum due in part to its weight, availability, machinability, cost and expansion properties, as will be discussed henceforth.

Referring back to FIGS. 6 and 8, in the preferred cavity configuration, an upstanding shoulder 66 peripherally extends about the cavity 60 upon which the transparent plate 46 seats atop. While the shoulder 66 illustrated is continuous in form, it will be appreciated that the surrounding shoulder may be discontinuous or segmented in nature without departing from the true spirit and nature of the present invention.

Moreover, it will be understood that when the die 43 is mounted to the transparent plate 46, the undersurface 52 of at least one side thereof extends beyond a peripheral edge portion 67 of the die 43 to form at least one ledge portion 68. This undersurface ledge portion 68 of plate 46 is formed to supportably seat against at least one support portion 70 of shoulder 66. These opposed abutting surfaces are adapted to cooperate for vertical support of the transparent plate 46 and the die 43 (i.e., the display device 41) atop the substrate 42 while the die undersurface 57 remains relatively free of substantial supportive mounting to the substrate 42.

FIGS. 7 and 8 illustrate that, preferably, the opposed sides of transparent glass 46 both extend beyond the opposed corresponding peripheral edge portions 67, 67' of the die 43. Accordingly, at least two opposed ledge portions 68, 68' are formed from the undersurface 52 of the transparent plate 46 for seating support atop the corresponding support portions 70, 70' of the substrate shoulder 66. In this embodiment, the opposed support portions 70, 70' are configured to engage the corresponding ledge portions 68, 68' for vertical support thereatop.

It will be appreciated, of course, that more than two supportive ledge portions may be provided or that the two ledge portions or combination thereof need not be opposed to one another. For example, the two ledge portions and corresponding support portions of the shoulder may be adjacent one another (i.e., in an L-shape (not shown)). Moreover, only a segment of the selected ledge portion needs to be vertically supported atop the corresponding support portion of the shoulder. This is especially true if the ledge portion is substantially continuous and extends substantially around the periphery of the die peripheral edge, such as in a curvilinear structure. In other configurations, the cavity may be defined by only two opposed support portions which compose the shoulder portion, such as in a U-shaped substrate, or an L-shaped configuration having only two adjacent support portions of the shoulder.

To access cavity 60, the above-mentioned port 63 extends into cavity 60 between the mounted transparent plate 46 and the support shoulder 66. In this arrangement, while the opposed ledge portions 68, 68' are formed to extend over the support portions 70, 70' of the substrate shoulder 66, an access edge 71 disposed between the ledge portions 68, 68' is configured not to extend over the corresponding shoulder. This port formation enables access to the thermoconductive material 65, or provides for the passage of air flow through the gap 61 between the die undersurface 57 and the substrate cavity floor 62.

In one embodiment of the present invention, it has been determined that the direction of the warp or bow of the substrate may be generally predicted and modulated by varying the thickness of the cavity base 72 (FIGS. 8–10) of the substrate. Moreover, the degree of the bow may be proportionally controlled as well. Generally, a net "positive bow" is considered more desirable than a negative bow. This is due in-part to the structural integrity of the display device cell (i.e., the liquid crystal filled sealed volume) which is less prone to delamination since a positive bow induces compressive forces thereupon. In contrast, in a negative bow, tensile forces are urged upon the display device cell which substantially increases the probability of plate delamination.

To modulate a net positive bow upon LCD assembly 40 during operational heating, the opposed ledge portions 68, 68' of the transparent plate 46 are rigidly or semi-rigidly attached to the opposed support portions 70, 70' of shoulder 66. While other conventional attachment methods may be employed, the transparent plate 46 is preferably mounted to the substrate of the present invention through adhesives 73, 73'. The two-sided bonding of the opposed ledge portions 68, 68' to the respective opposed shoulder support portions 70, 70' enables directional modulation to control the resulting bow of the LCD assembly 40, as well as provides substantial bonding integrity.

For example, when an unrestrained display device 41 (i.e., the transparent plate 46 and the suspended die 43 mounted thereto) is heated during normal operation (i.e., about 50° C.), the natural stress configuration, may cause a slight negative bow or a slight positive bow. However, when the cavity configured support substrate 42 of the present invention is heated under the substantially similar conditions, a slight positive bow always effected which functions to counteract the negative bow of the display device in some instances. This counteracting positive bow of the substrate may thus be urged upon the display device 41 when the shoulder support portions 70, 70' are mounted to the corresponding transparent plate ledge portions 68, 68'.

In accordance with the present invention, it has been found that as the cavity base thickness is decreased, the greater the degree of positive bow that results during thermal excursion. Hence, the degree of the modulated, net positive bow is inversely proportional to the thickness of the cavity base 72.

It will be understood, however, that when the cavity base becomes too thin, the positive counteracting forces may be insufficient to off-set the natural negative bow of the display device 41. For instance, in 1.0 mm thick cavity base of aluminum substrate 42, a net negative bow of the LCD assembly of about −2,220 Å has typically been measured during thermal cycling from about −30° C. to about 70° C. By comparison, as diagrammatically illustrated in FIG. 8, for about a 2.0 mm thickness cavity base of the aluminum substrate, a net positive bow of about 800 Å has been measured. Finally, for about a 4.0 mm thickness cavity base 72 of the aluminum substrate 42 (FIG. 9), a net positive bow of about 20,000 Å has been measured when thermal cycled from about −30° C. to about 70° C.

As mentioned above, the opposed ledge portions 68, 68' of the transparent plate 46 are rigidly or semi-rigidly mounted to the opposed support portions 70, 70' of shoulder 66 through opposed strips of adhesive 73, 73. As illustrated in FIG. 8, the bond formed by these opposed elongated adhesive strips 73, 73' are preferably continuous and are of sufficient strength to prevent delamination of the transparent plate during the modulated positive bow of the substrate in accordance with the present invention. In the preferred form, the adhesive is electrically conductive to provide an electrical connection and thermal conductivity between the transparent plate 46 and the shoulder 66 of substrate 42. This conductive property enables electrical grounding of the transparent plate to the substrate, as well as thermal conductivity to provide a pathway to the substrate to dissipate heat generated by the die. Should a conductive coating be applied to the undersurface 52 of the plate, such as indium-tin oxide, the conductive adhesive would preferably contact this coating. Suitable conductive adhesive materials known in the art include conductive epoxies, acrylics, plastics, polymers and mixtures thereof, or the like. One of the preferred adhesives is provided by conductive silver adhesive.

The substrate preferably includes a thin polyimide tape 75 is applied to the top surface 58 of the substrate as shown in FIGS. 8–10 which includes associated circuitry for electrical communication with the die 43. Further integrally formed into the polyimide tape 75 are the substrate bond pads 76 positioned on a corresponding cavity surrounding edge opposite the die bond pads 53 when the display device 41 is mounted thereto. The substrate bond pads 76, thus, can be easily mounted to the substrate 42 by securely affixing the backside of the polyimide tape to the top surfaces 58 of the shoulder 66 surrounding cavity 60.

The polyimide tape 75 further includes a metal or conductive strip 74 extending substantially adjacent and top support portion 70 of shoulder 66 which the ledge portion 68 of transparent plate 46 is mounted to. This metal strip provides a ground for the transparent plate 46 which is electrically and thermally connected thereto through the conductive adhesive mount 73 above-discussed. Moreover, by planarizing the connection with the ledge portion 68 of the transparent plate 46, a pedestal-type contact which is employed in the prior art rigid constructions is not necessary. This arrangement is beneficial in that the planar contact substantially reduces and minimizes any expansive effects along the axis extending generally perpendicular to the top surfaces of the transparent plate 46 and substrate 42.

Referring now to FIGS. 10–13, a preferred embodiment of the present invention is illustrated which is advantageously configured to minimize substantially all the stress induced warpage urged on the cell by the substrate. This is performed by fixedly attaching only one side of the transparent plate 46 to a selected support portion 70 of the shoulder 66. This rigid or semi-rigid mount is preferably provided by a conductive adhesive 73 applied between the ledge portion 68 and the corresponding support portion 70 of the shoulder. In this manner, the display device 41 is substantially cantilever mounted to a single support portion of substrate shoulder 66. Accordingly, for a generally rectangular-shaped display device, the remaining three sides will be substantially free for lateral movement relative the corresponding vertically supporting portions of the shoulder 66 thereunder. The opposed and/or adjacent ledge portions 68, 68', thus, are not rigidly or semi-rigidly fixed or mounted to the substrate so that the warpage of the support substrate 42 during thermal excursion will substantially not be transferred to the display device.

In effect, the display device 41 is cantilever mounted to a selected support portion 70 of the shoulder 66 while the remaining portion is supportively floated atop the thermoconductive material placed between the cavity floor 62 and the undersurface 57 of the die 43. Thermal conductivity is therefore permitted to transfer therebetween, while the display device remains insulated from the transmission of residual stress induced by or acting upon the substrate 42.

Figure 11:
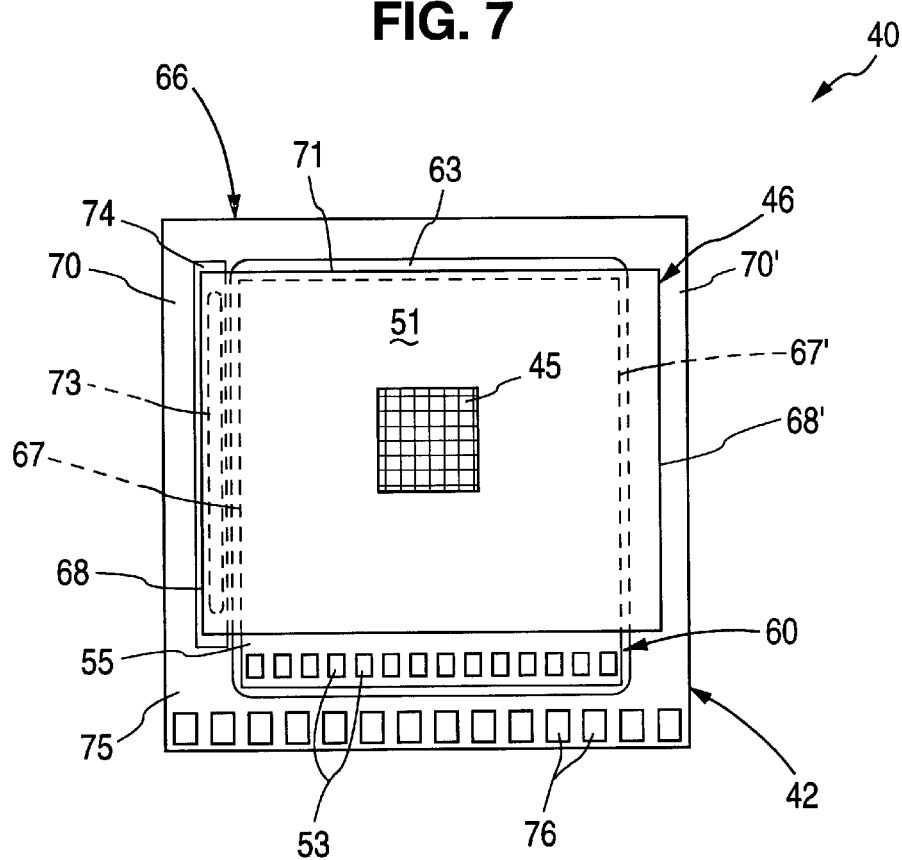
FIGS. 11–13 are reduced top plan views of the LCD assembly of FIG. 10 showing alternative embodiment single adhesive mounts attaching the transparent plate to the substrate.

As best shown in FIG. 11, the strip of conductive adhesive 73 is preferably continuous and extends substantially from one end of the ledge portion 68 to the opposite end of the ledge portion 68. This attachment configuration is advantageous in that a relatively secure bond may be formed between the ledge portion 68 and the shoulder support portion 70, while a substantially stress free display device is maintained in most directions between the transparent plate and the die.

Figure 12:
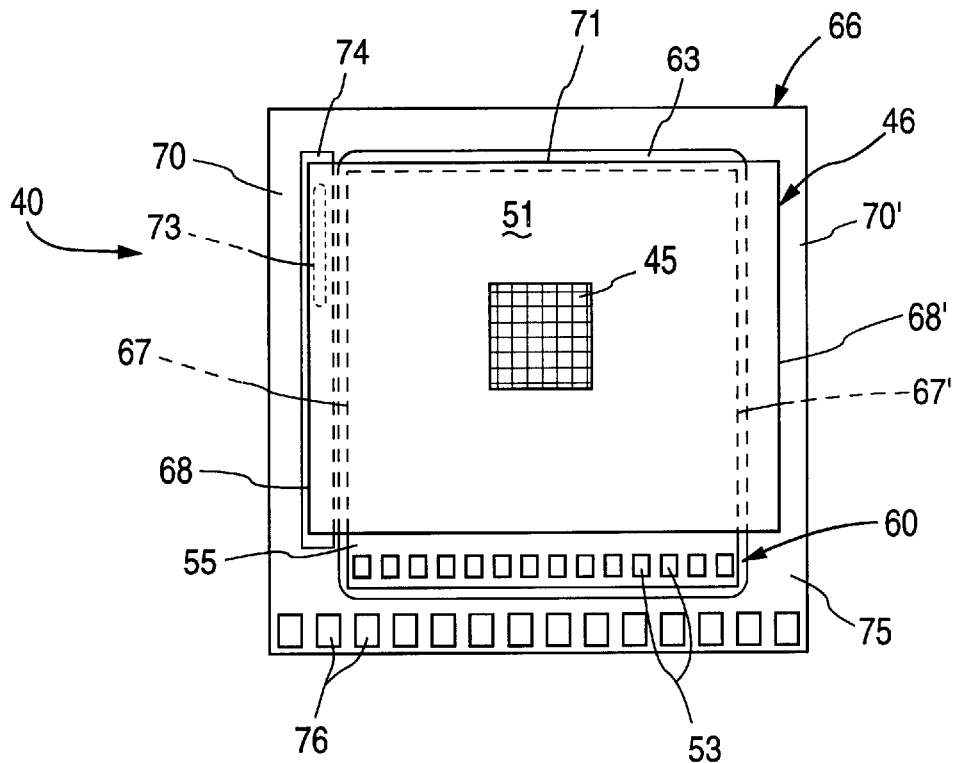

In an alternative embodiment of the cantilever mounted display device 41 is illustrated in FIG. 12, the adhesive strip, 73 between the die and the substrate only extends less than about half the length of ledge portion 68. This arrangement enables even greater flexibility for the display device 41 for relative movement with the substrate 42. The length dimension of this adhesive strip may, of course, be increased or decreased depending upon the desired bonding strength or the like.

Figure 13:
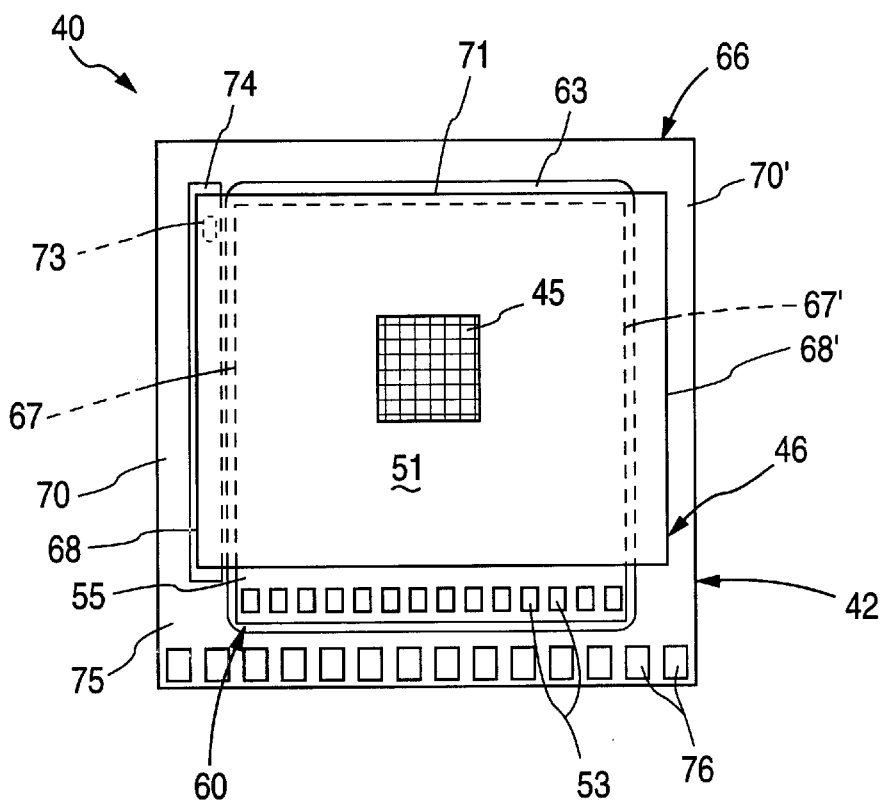

In another embodiment, as shown in FIG. 13, the adhesive mount between the ledge portion 68 and the shoulder support portion 70 may be provided by a single point mount. The display cell is therefore only laterally constrained to the point of attachment. This attachment configuration, hence, maximizes movement flexibility since the point mount of the adhesive 73 enables partial pivotal movement between the display device 41 and the support substrate.

It will be appreciated that two or more spaced-apart adhesive point mounts or segments positioned longitudinally along ledge portion 68 may be provided rather than a continuous adhesive strip without departing from the true spirit and nature of the present invention.

As best viewed in FIGS. 6, 7 and 11–13, substrate 42 includes a plurality of substrate bond pads 76 positioned on one end thereof. Preferably, this end of the substrate corresponds to where the die bond pads 53 of the die 43 are preferably situated when the die 43 is seated within the cavity 60. Bonding wires 77 can be applied to wire bond the die bond pads 53, including any ground bond pads, to the substrate bond pads 76.

The single adhesive attachment between the display device 41 and the substrate shoulder 66 is sufficiently rigid to achieve a reliable wire bond between the die bond pads 53 of the suspended die 43 and the substrate bond pads 76. This wire bond rigidity of the floating configuration is further facilitated by the high strength of the silicon die 43 thermally bonded to the transparent plate 46. Further vertical support and dampening may be provided in part by the thermoconductive material 65 between the cavity floor 62 and the die undersurface 57.

The LCD assembly 40 can then be packaged in one of the many forms of packaging. In one embodiment, a glob coating (not shown) may be applied to and between the die bond pads 53 and the substrate bond pads 76. This glob coating provides protection for bonding wires 77 and the internal elements of die 43, such as bond pads 76, ground pads, and ground bond pads.

It will be appreciated that this glob coating will preferably not be utilized to create a second seal around the periphery of the transparent plate 46 to the substrate 42, or be positioned between the die 43 and the substrate. In this arrangement, should the glob coating be too rigid, the glob coating would essentially bond the die to the substrate in a rigid or semi-rigid manner.

In another aspect and as apparent from the description of the present invention, a method is provided for packaging a liquid crystal display assembly 40. The method includes the steps of: providing a display device 41 including a die 43 having a pixel array 45, a transparent plate 46, an adhesive seal 47 adhesively coupling the die 43 to the transparent plate 46, and a liquid crystal material 51 disposed within a sealed volume formed between the adhesive seal 47, the transparent plate 46 and the die 43. The method then includes mounting the transparent plate 46 to a support substrate 42 for support of the display device 41 such that the die 43 is substantially insulated from transmission of residual stresses induced by or acting upon the substrate 42.

In the preferred embodiment, the mounting step may include the step of applying an adhesive 73 to not more than a single point location (FIG. 13) or not more than a single strip location (FIGS. 11 and 12) between the transparent plate 46 and the substrate 42 for mounting thereto. Preferably, the present inventive method includes the step of providing a cavity 60 in a top surface 58 of the substrate 42 formed and dimensioned for receipt of the die 43 therein when the display device 41 is mounted to the substrate 42.

In another method of the present invention, a method of packaging a liquid crystal display assembly 40 is included comprising the steps of: adhesively coupling a transparent plate 46 to a die 43 having a pixel array 45 such that at least one ledge portion 68 of the plate 46 extends beyond a peripheral edge portion of the die 43; and depositing a liquid crystal material 51 within a sealed volume formed between the adhesive seal 47, the transparent plate 46 and the die 43. The inventive method further includes the step of affixing the ledge portion 68 of the transparent plate 46 to an upstanding shoulder 66 of a support substrate 42 for support of the transparent plate 46 and the die 43 with the substrate 42 while an undersurface 57 of the die 43 remains relatively free of substantial supportive mounting to the substrate 42.

What is claimed is:

1. A liquid crystal display assembly comprising:
   a display device including:
      a die having a pixel array;
      a transparent plate;
      an adhesive seal adhesively coupling the die to-the transparent plate, said adhesive seal, said transparent plate, and said die cooperating to define a sealed volume therebetween encompassing the pixel array; and
      a liquid crystal material disposed within the sealed volume; and
      a support substrate having said transparent plate cantilever mounted thereto for support of said display device by said support substrate such that said die is substantially insulated from transmission of residual stresses induced by or acting upon said support substrate.

2. A liquid crystal display assembly as defined in claim 1, wherein the support substrate includes a shoulder portion defining a cavity formed for receipt of said die therein the substrate shoulder portion being adapted to support said ledge portion of said transparent plate for support of said transparent plate and said die while said die remains substantially free of direct contact with said relatively rigid support substrate.

3. A liquid crystal display assembly as defined in claim 2, wherein said transparent plate cantilever mounted to said support substrate at a single point location of the shoulder portion and in lateral sliding support with opposed contact locations of the shoulder portion spaced-apart from the single point location.

4. A liquid crystal display assembly as defined in claim 3, wherein said transparent plate is cantilever mounted to said support substrate proximate a single peripheral side of the shoulder portion and in lateral sliding support with opposed contact locations of the shoulder portion spaced-apart from the single peripheral side.

5. The liquid crystal assembly of claim 1, wherein the transparent plate is coupled to the support substrate with an electrically conductive adhesive mounting.

6. A liquid crystal display assembly comprising:
   a die having a pixel array, a top surface and an opposite undersurface;
   a transparent plate;
   an adhesive seal adhesively coupling the die to the transparent plate such that a ledge portion thereof extends beyond a peripheral edge portion of said die and said adhesive seal, said transparent plate, said adhesive seal, and said top surface of the die cooperating to define a sealed volume encompassing the pixel array;
   a liquid crystal material disposed within the sealed volume; and
   a relatively rigid support substrate mounted to said transparent plate in a manner such that said die remains substantially free of direct contact with said relatively rigid support substrate, said support substrate further including a base portion having a selected dimension which, during operational heating of the display assembly, effects predetermined bowing or warping forces on the transparent plate to modulate a net bowing or warping effect on the display assembly.

7. The liquid crystal display assembly of claim 6, wherein the support substrate includes a shoulder portion defining a cavity formed for receipt of said die therein, the substrate shoulder portion being adapted to support said ledge portion of said transparent plate for support of said transparent plate and said die while said die remains substantially free of direct contact with said relatively rigid support substrate.

8. The liquid crystal display assembly of claim 7, wherein the dimension varied is the thickness of said base.

9. The liquid crystal display assembly of claim 8, wherein the thickness of said base is selected to modulate a slight net positive bow upon the display assembly.

10. The liquid crystal display assembly of claim 8, wherein the thickness of the base is between about 1.0 mm to about 4.0 mm.

11. The liquid crystal display assembly of claim 6, wherein the transparent plate is coupled to the relatively rigid support substrate with an adhesive mounting.

12. The liquid crystal display assembly of claim 11, wherein the adhesive mounting is electrically conductive.

13. A method of modulating warping and bowing stresses in a liquid crystal display assembly, the method comprising:

providing a display device including a die having a pixel array, a top surface and an opposite undersurface; a transparent plate with a ledge portion, an adhesive seal coupling the die to said transparent plate, and a liquid crystal material disposed within a sealed volume formed between the adhesive seal, the transparent plate, and the top surface of the die;

selecting a relatively rigid support substrate having a selected dimension to effect for predetermined warping and bowing forces, during operational heating of the display assembly, upon on the display device once coupled to said relatively rigid support substrate to modulate a net bowing or warping effect on the display assembly.

14. The method of claim 13, further including coupling the display device to the relatively rigid support substrate via the ledge portion of the transparent plate, wherein said die remains relatively free of substantial direct contact to said relatively rigid support substrate.

15. The method of claim 14, wherein the relatively rigid support substrate has a cavity formed and dimensioned for receipt of said die therein, said cavity having a base and a shoulder portion adapted to cooperate with said ledge portion of said transparent plate for support of said transparent plate.

16. The method of claim 14, wherein the predetermined dimension specification is a measure of thickness of the base.

17. The liquid crystal display assembly of claim 16, wherein said selecting includes choosing the thickness of said base to modulate a slight net positive bow upon the display assembly.

18. The method of claim 16, wherein the base is between about 1.0 mm to about 4.0 mm thick.

\* \* \* \* \*